United States Patent [19]
Wong et al.

[11] Patent Number: 5,943,283
[45] Date of Patent: Aug. 24, 1999

[54] ADDRESS SCRAMBLING IN A SEMICONDUCTOR MEMORY

[75] Inventors: Sau C. Wong, Hillsborough; Hock C. So, Redwood City, both of Calif.

[73] Assignee: Invox Technology, Campbell, Calif.

[21] Appl. No.: 08/986,210

[22] Filed: Dec. 5, 1997

[51] Int. Cl.$^6$ ............................................. G11C 8/00
[52] U.S. Cl. ..................... 365/230.01; 365/221
[58] Field of Search ............... 365/230.01, 221; 380/4; 711/164

[56] References Cited

U.S. PATENT DOCUMENTS

| | | | |
|---|---|---|---|
| 5,081,675 | 1/1992 | Kittirutsunetorn | 380/4 |
| 5,587,954 | 12/1996 | Vogley et al. | 365/221 |
| 5,765,197 | 6/1998 | Combs | 711/164 |

*Primary Examiner*—David Nelms
*Assistant Examiner*—David Lam
*Attorney, Agent, or Firm*—Skjerven, Morrill, MacPherson, Franklin & Friel LLP; Alan H. MacPherson; David T. Millers

[57] ABSTRACT

A semiconductor memory includes a memory array and an address scrambler. The address scrambler maps sequential input addresses to non-sequential physical addresses for the memory array. In one embodiment, the address scramble includes circuitry that implements a one-to-one function mapping of the logical addresses to physical addresses. Alternatively, the address scrambler includes a pseudo-random series generator that generates a pseudo-random series for the physical addresses. In either case, consecutive memory accesses that would logically correspond to a single row or column are scattered among multiple rows and columns to diminish the length of a gap in a data sequence that would otherwise occur as a result of a defective row or column. For flash memory, the mapping can be restricted so that logical addresses for a sector map to physical address for the same or another sector. The scrambler optionally includes a volatile storage for a key or access code that selects the mapping or series used for determining the physical addresses. The access code used when recording must also be used during playback or the correct data will not be accessed.

20 Claims, 5 Drawing Sheets

ADDRESS SCRAMBLING IN A SEMICONDUCTOR MEMORY

BACKGROUND

1. Field of the Invention

This invention relates to semiconductor memory and to methods and circuits for storing data in semiconductor memory at addresses selected to reduce the noticeable effects of defects and to memory with built-in security against unauthorized access of stored data.

2. Description of Related Art

Some semiconductor memory systems can record and playback continuous analog signals such as audio or image signals. In such systems, a recording process takes samples (i.e., instantaneous measurements of the level) of an analog signal to generate a data sequence that the semiconductor memory stores.

Depending on the type of memory, each sample is stored in digital form with one or more bits per memory cell or in analog form with one sample per memory cell. Such memory systems often include an address counter which indicates an address for storage of a sample in a data sequence. The address counter increments the address each time a sample is written so that samples are written at consecutive addresses. To play or recreate the recorded analog signal, the data sequence is read from the semiconductor memory in the sequential order of the recording, and samples read are sequentially converted to levels in an output signal.

Generally, a semiconductor memory includes an array of memory cells arranged in rows and columns and partitioned into independently addressable storage locations. Conventionally, each storage location corresponds to one or more memory cells in a row of the array. An address for a storage location identifies the row and the column associated with a memory cell in the storage location. Commonly, the most significant bits of an address form a row address that identifies the row containing the storage location, and the least significant bits of the address form a column address that identifies a column corresponding to one of the memory cells in the storage location. Often, when storing a sequence of samples to consecutive memory addresses, the column address is sequentially incremented, and the row address remains constant until the column address reaches the last position in the row. This fills a row of memory cells before starting writes to the next row.

For an audio recording and playback application, when a row or large number of adjacent cells in a row are defective, the defective cells contain unpredictable or incorrect values; and during signal playback, noticeable deadtime, static, or signal distortion appears in the portion of the signal recorded in defective memory cells. If all or a large number of memory cells in a column are defective, an error occurs in the signal played back each time a sample is read from a storage location including a defective memory cell. A column error thus results in periodic errors in the played-back signal where the period of the errors depends on the time required to read samples from a row. The errors may cause a repeating "pop" or "click" in a played-back sound. Periodic errors are undesirable because the human ear is attuned to detect such noise.

To handle hard defects (i.e., defects that are detectable by testing), most memories include redundant rows and columns of memory cells with redundant decoding circuits. When a defective row, a defective column, a number of defective adjacent memory cells, or even a single defective memory cell is detected during testing of a memory IC, a redundant row or column can be activated to replace the defective cells. Replacing defects in this manner increases memory cost because the redundant circuits increase integrated circuit area and because activation of the redundant circuits typically requires additional processing steps, such as laser programming during or after testing. Furthermore, a memory may still have latent defects or soft errors, which appear only after a specific period of operation of the memory. In the normal test flow, these defects typically cannot be detected as requiring replacement. Methods and circuits are thus sought to handle defects in semiconductor memory and record-and-playback systems and avoid lengthy disruptions or periodic errors that result from memory array defects.

SUMMARY

In accordance with the invention, sequential data such as samples representing an audio signal are stored in non-sequential storage locations. As a result, row and column defects cause distributed errors. The distributed errors are less noticeable and more easily corrected using filters or, for digital memory, error correction codes. The address selection for data storage can be such that neither row nor column defects cause lengthy dead time or periodic errors in a played-back signal. Instead, row defects and column defects cause pseudo-random noise which in audio signals is less noticeable. To implement record and playback processes in accordance with an embodiment of the invention, an address scrambler maps input or logical addresses to physical addresses for a memory array. The mapping is such that consecutive logical addresses are not mapped to the same physical row or column in an array.

In accordance with another aspect of the invention, the address scrambler selects a mapping from logical addresses to physical addresses based on a user-provided key or access code. Accordingly, a signal such as a recorded sound or voice signal is unintelligible when played back unless the user provides the same key for playback as was used for the recording. Accordingly, the system provides hardware-based security against unauthorized playback of recorded messages.

One memory system in accordance with an embodiment of the invention includes a memory array, an address counter that generates sequential logical addresses for record and playback operations, and a scrambler coupled to address counter and the memory array. The scrambler maps sequential logical addresses from the counter to non-sequential physical addresses for the memory array. The scrambler includes arithmetic logic that implements a one-to-one mapping of the logical addresses to physical addresses in the array. For flash memory embodiments, the mapping can be restricted so that logical addresses for a sector map to physical address for the same or another sector. In a specific embodiment, the scrambler includes an adder that combines a logical column address and a logical row address in generating a physical row or column address. The scrambler alternatively or additionally includes a mixer that permutes or mixes the bits of the logical row and column addresses. The scrambler may optionally include a register for a key or access code that selects the bit permutation and more generally selects the function implemented for mapping logical addresses to physical addresses.

Another memory system includes an address generator that generates a pseudo-random sequence. The address generator directs a sequence of memory accesses to storage locations that are scattered throughout a memory array or a sector within a memory array.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a memory system includes an address scrambler that converts sequential logical addresses to non-sequential physical addresses for a memory array. Thus, record and playback operations use sequential input addresses for a data sequence but access storage locations that are not sequential in a row or column. Accordingly, use of memory with defects such as column and row defects do not cause loss of lengthy runs of consecutive data values. Instead, row defects and column defects cause scattered errors. Such scattered errors are tolerable in error tolerant memory applications such as voice, sound, and digital imaging. Accordingly, the cost of a record-and-playback system can be reduced by eliminating redundant rows, columns, and decode circuits and eliminating the processing and testing steps that activate redundant circuits.

Figure 1:
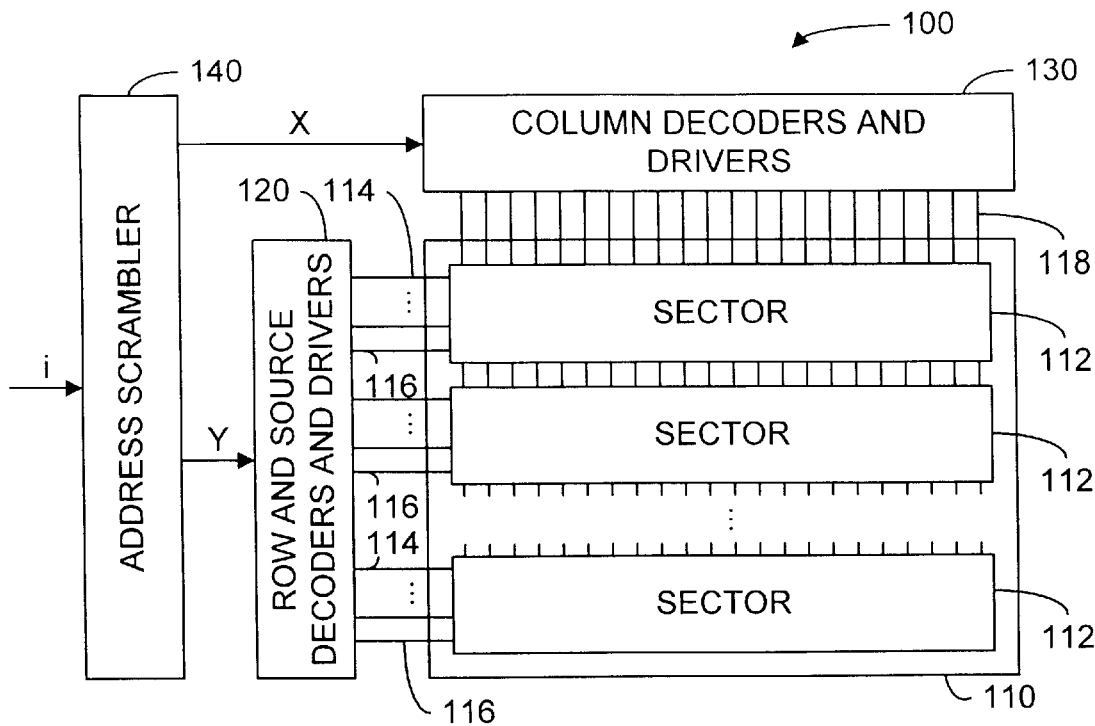
FIG. 1 shows an analog flash memory system that includes row-based sectors and address scrambling in accordance with an embodiment of the invention.

FIG. 1 shows a semiconductor memory 100 in accordance with an embodiment of the invention. Memory 100 is an analog flash memory which includes an array 110 of memory cells, where each memory cell in the array is an independently addressable storage location capable of storing an analog value. Flash memory such as flash EPROM or flash E²PROM is non-volatile and has independently erasable sectors 112 of memory cells. Alternative embodiments of the invention employ different memory architectures as in non-volatile memories such as EPROM and E²PROM and volatile memories such as DRAM and SRAM, and each memory cell can store an analog value or one or more bits of a digital value.

Figure 3:
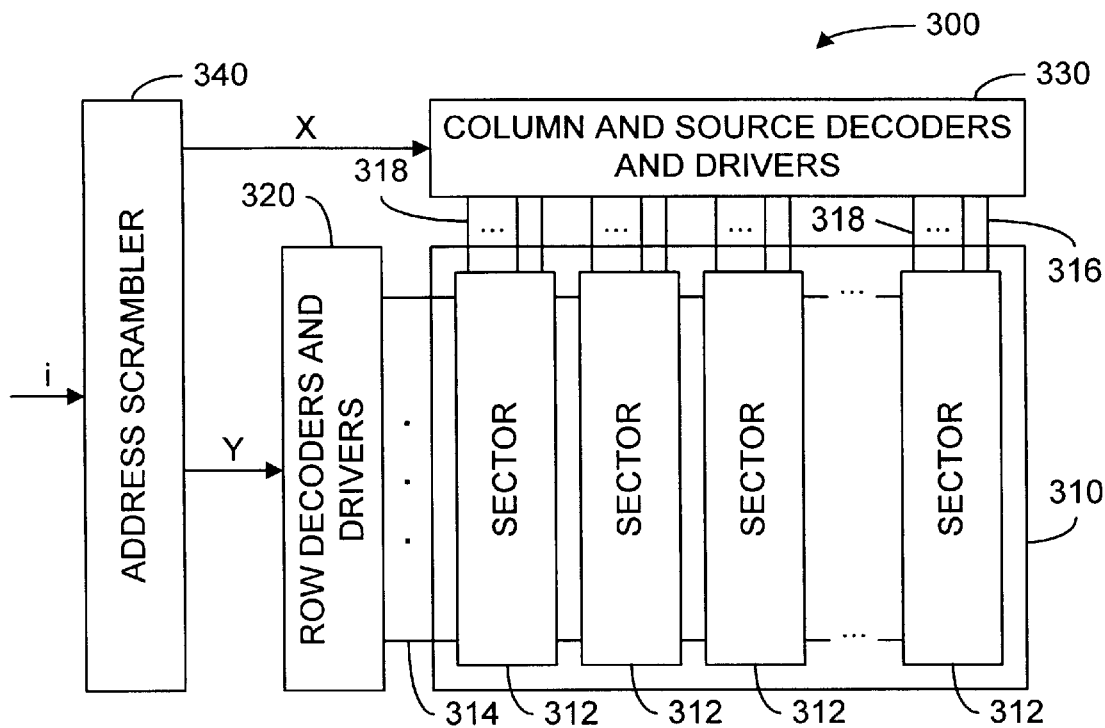
FIG. 3 shows an analog flash memory system that includes column-based sectors and address scrambling in accordance with an embodiment of the invention.

Array 110 contains rows and columns of memory cells such as floating gate or split gate transistors having control gates coupled to row lines 114 and drains coupled to column lines 118. Each row line 114 connects to an associated row of memory cells in array 110. Each column line 118 connects to an associated column of memory cells in array 110. Array 110 is also divided into independently erasable sectors 112, where each sector contains one or more rows of memory cells. FIG. 3 shows an alternative flash memory architecture employing sectors that contain columns rather than rows of memory cells. Each sector 112 in array 110 has a source line 116 that connects to the sources of the memory cells in the sector. Row and source decoders and drivers 120 connect to row lines 114 and source lines 116 and apply voltages to selected row and source lines as required for erase, write, and read operations. Column decoders and drivers 130 connect to column lines 118 and apply voltages to selected column lines as required for erase, write, and read operations. U.S. patent application Ser. No. 08/781,741, entitled "Source Biasing in Non-Volatile Memory having Row-Base Sectors", describe decoders and drivers 120 and 130 for specific embodiments of the invention and is incorporated by reference herein in its entirety.

During a read or write to memory array 110, row decoder 120 and column decoder 130 respectively require a row address and a column address that respectively identify a row line and a column line coupled to the memory cell (i.e., storage location) being read or written. In accordance with an aspect of the invention, memory 100 includes an address scrambler 140 that generates a physical address from an input logical address i. The physical address contains a physical row address Y and a physical column address X that respectively represent row and column numbers for a memory cell in array 110. Input address i may be an address signal input to memory 100 for random access to memory cells in array 110 or may be from an on-chip counter that generates a sequential address signal for recording or playing back a data sequence. Input address i logically identifies a storage location being accessed but is not required to contain the physical row and column number identifying a location in array 110. Instead, scrambler 140 converts the input address i to the physical address for the storage location being accessed.

Scrambler 140 can employ a variety of scrambling or encryption techniques when converting an input (or logical) address to a physical address. Generally, when input address i is restricted to the address space of array 110, scrambler 140 implements a one-to-one mapping of the address space of array 110 back onto itself. With a one-to-one mapping, a user uses input address i for memory accesses, and the actions of scrambler 140 are transparent to the user. Scrambler circuits implementing such mappings can take a variety of forms particularly because of the large number of possible mappings for a typical size memory array.

For flash memory embodiments of the invention such as memory 100, scrambler 140 preferably maps all input addresses logically associated with a sector to physical addresses within a single sector, either the same sector or another sector. This keeps data targeted for a sector together so that erasing a sector erases the data targeted to be together. For example, in an audio recording and playback system, an audio signal is represented as a continuous sequence of samples. It is often desirable to erase only a specific duration of the audio signal by erasing a portion of the sequence. If consecutive samples of an audio signal are stored in the same sector, erasing a sector erases only a piece of the audio signal but leaves the remainder of the audio signal intact. The duration of the portion erased depends on the size of each sector in the memory. Accordingly, a mapping that maps a sector onto a sector preserves the ability to erase selected portions or periods of a recorded signal.

Figure 2:
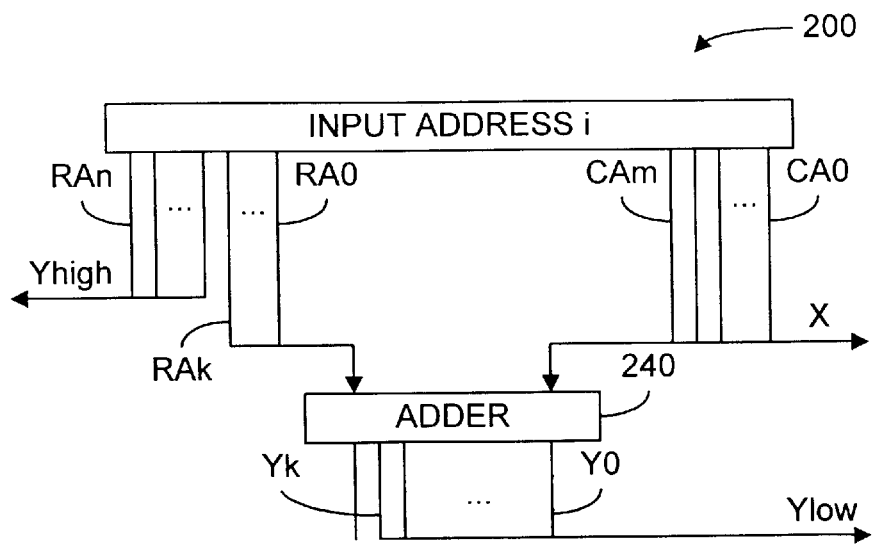
FIG. 2 shows an address scrambler for the memory of FIG. 1.

FIG. 2 shows an embodiment of an address scrambler 200. Scrambler 200 splits input logical address signal i into (m+1) least significant bits CA0 to CAm and (n+1) most significant bits RA0 to RAn. Bits CA0 to CAm represent an input logical column address CA, and bits RA0 to RAn represent an input logical row address RA. For scrambler 200, the physical column address X for memory array 110 is the same as input column address CA, but the physical row address Y is a combination of input column address CA and input row address RA such that row address Y changes when input row address RA is constant and input column address CA changes. Thus, scrambler 200 maps sequential input addresses having a single value for input row address RA to several different rows in array 110.

Scrambler 200 uses an adder 240 to generate physical row address Y for array 110 from input row and column addresses RA and CA. The most significant bits of row address Y identify a sector in array 110 and are the same as bits RA(k+1) to RAn of input row address RA. Accordingly, scrambler 200 does not change the sector that input address i identifies for access but maps sequential input logical addresses corresponding to memory cells located along diagonals in the sector. Alternatively, scrambler 200 could map the sector identified by input bits RA(k+1) to RAn to a different sector using one-to-one mapping of sectors onto themselves. Adder 240 adds input column address CA to the (k+1) least significant bits RA0 to RAk of input row address RA to generate (k+1) least significant bits Y0 to Yk of row address Y, where each sector 112 contains (k+1) rows of memory cells. Any carry bits are ignored. The least significant bits Ylow of row address Y identify a row within a sector. Since adder 240 adds input row address RA and input column address CA together when generating physical row address Y, both column address X and row address Y change when input address i increments, and two consecutive values of input address do not map to the same physical row.

A potential concern for scrambler 200 arises when a sequence of input addresses increments input row address RA and keeps input column address CA constant. A sequence of input addresses with constant input column address CA is a logical column. Scrambler 200 maps such a sequence of input addresses to the same physical column so that the data sequence is written or read from a single physical column. In such cases, a column defect can cause errors in a long run of sequential data. However, with the input column address CA being defined as the least significant bits of the input address i, the natural ordering of input address corresponds to a row and not a column. An address counter, for example, which could supply the input address i when writing or reading a data sequence most conventionally sequentially adds to the least significant bits of input address i which form column address CA. Sequential input addresses from such a counter correspond to storage locations scattered across the physical rows in a sector.

FIG. 3 shows a semiconductor memory 300 including a memory array 310 having sectors 312, where each sector 312 contains one or more columns of analog memory cells. Each sector 312 in array 310 has a source line 316 that connects to the sources of the memory cells in the sector. Source and column decoders and drivers 330 connect to source lines 316 for sectors 312 and to column lines 318 for columns of memory cells in array 310. Row decoder and drivers 320 connect to row lines 314 for rows of memory cells in array 310. Using circuits and processes known in the art, decoders and drivers 320 and 330 apply voltages to selected row, column, and source lines as required for erase, read, and write operations. Since each sector of array contains several columns, writing sequential data to column-by-column may be more convenient than writing the data row-by-row. An address scrambler 340 provides row and column address signals Y and X to identify a memory cell selected for a read or write operation. Address scrambler 340 preferably maps logical columns as identified by a constant input logical column address CA to randomly distributed columns in a sector 312.

Figure 4:
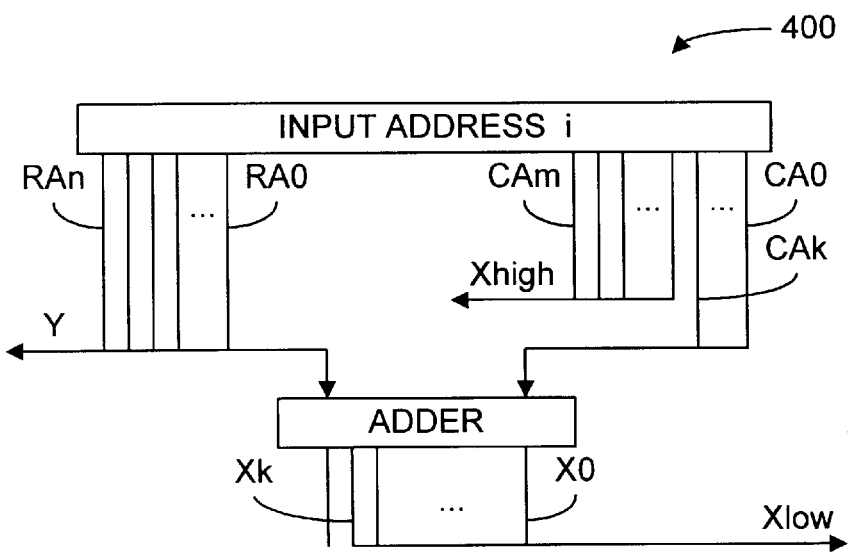
FIG. 4 shows an address scrambler for the memory of FIG. 3.

FIG. 4 shows an embodiment of an address scrambler 400 for memory 300. Scrambler 400 is the same as scrambler 200 of FIG. 2, except that the roles of input row address RA and input column address CA are reversed from those described above in regard to FIG. 2. In FIG. 4, k is the number of columns in a sector 312. Scrambler 400 prevents a data sequence with constant input column address CA from being mapped to a single physical column. Instead such a data sequence is scattered across the columns of a sector.

An advantage of scattering write addresses across row or columns of a flash memory array is reduction in the accumulated disturbance of data in the first rows of the array. In particular, writing short data sequences conventionally only writes to the first rows, and programming voltages applied to row lines disturb data values stored in memory cells in the first rows. Address scrambling spreads the disturbance across the array even for short data sequences. Scramblers 200 and 400 respectively scramble the row and column addresses. Scrambling only the row address or only the column address may have a speed advantage in a memory where column or row decoding is relatively slow. For example, time delay cause by scrambling row addresses may be partially or totally hidden in read or write times that are delayed by slower column decoding circuits. As discussed above, scrambling only rows or only columns is useful for eliminating long runs of lost data caused respectively by row defects or column defects. A disadvantage of using scrambler 200 with an array having a row defect or using scrambler 400 with an array having a column defect is the creation of a periodic error. The periodic error may be noticeable in an analog signal such as an audio signal. The periodic nature of the error can be eliminated using a scrambler that is more random than scrambler 200 or 400.

Figure 5:
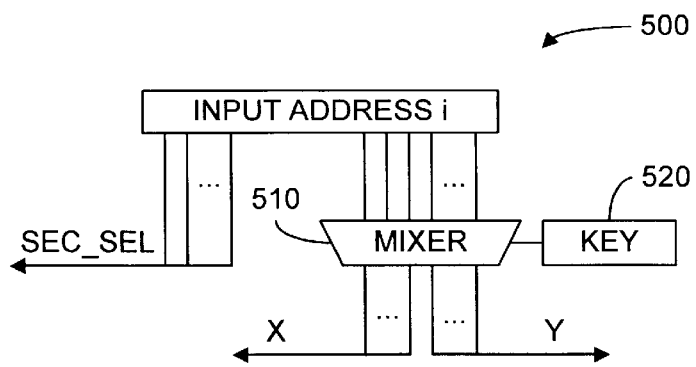
FIG. 5 shows an address scrambler that permutes bits of an input logical address.

FIG. 5 illustrates an alternative address scrambler 500 in accordance with an embodiment of the invention. Address scrambler 500 includes a mixer 510 having input terminals coupled to some or all of the bits of input address i. The bits of input address i that are not coupled to mixer 510 form a signal $SEC_{13}SEL$ that identifies a sector in a flash memory. Signal $SEC_{13}SEL$ may be, for example, the most significant bits of the logical row or column address depending on the sector configuration. Mixer 510 performs a one-to-one mapping of values of input address i to the values of an output address signal having parts X and Y. For example, mixer 50 can permute or reorder bits from input address i so that long runs of consecutive input address are not in the same row or column. Preferably, mixer 510 swaps some (but not all) of the bits of logical row address RA and with some (but not all) of the bits of logical column address CA so that neither a logical column nor a logical row is mapped to a physical column or row.

Table 1 shows example permutations of four bits of an input address.

TABLE 1

Scrambling by Permutations of Input Address Bits

| Input Address<br>RA\|CA<br>32\|10 | Permutation 1<br>Y\|X<br>01\|23 | Permutation 2<br>Y\|X<br>20\|31 | Permutation 3<br>Y\|X<br>21\|03 |
| --- | --- | --- | --- |
| 00 00 | 00 00 | 00 00 | 00 00 |
| 00 01 | 10 00 | 01 00 | 00 10 |
| 00 10 | 01 00 | 00 01 | 01 00 |
| 00 11 | 11 00 | 01 01 | 01 10 |
| 01 00 | 00 10 | 10 00 | 10 00 |
| 01 01 | 10 10 | 11 00 | 10 10 |
| 01 10 | 01 10 | 10 01 | 11 00 |
| 01 11 | 11 10 | 11 01 | 11 10 |
| 10 00 | 00 01 | 00 10 | 00 01 |
| 10 01 | 10 01 | 01 10 | 00 11 |
| 10 10 | 01 01 | 00 01 | 01 01 |
| 10 11 | 11 01 | 01 11 | 01 11 |
| 11 00 | 00 11 | 10 10 | 10 01 |
| 11 01 | 10 11 | 11 10 | 10 11 |
| 11 10 | 01 11 | 10 11 | 11 01 |
| 11 11 | 11 11 | 11 11 | 11 11 |

Example permutation 1, which swaps all of the address bits of input row address RA with all of the bits of input column address CA, maps a logical row to a physical column. Accordingly, if a data sequence is written to a logical row and example permutation 1 is used, the data sequence is stored in a physical column. This is undesirable because a column defect would cause loss of a lengthy sequence of consecutive data. Example permutation 2 and 3, which swap some of the bits of input row address RA with some of the bits of input column address CA, provide better mixing of a logical row into multiple physical columns and rows.

As a further aspect of the invention, scrambler 500 includes a storage element or register 520 for a key or access code. Register 520 can be user-accessible volatile memory to permit a user to change the key for writing or reading data in a memory. Based on the value of key in register 520, mixer 510 selects from among the set of suitable permutations input bits. A typical memory containing, for example, 512 physical row addresses and 512 column address has 18-bit addresses and about $6.4 \times 10^{15}$ possible permutations of address bits. If the memory has a flash architecture with 16 rows or columns per sector, 13-bits are available for permutations which keep data values within a sector, and there are about $6.2 \times 10^9$ possible permutations. Suitable permutations can be selected based on the effectiveness of the permutation at mixing sequential logical addresses in physical rows and columns and/or the similarity or dissimilarity to other suitable permutations. While not all of the possible permutation are suitable, a large number of suitable permutations should be available for a typical memory. This permits a large number of possible access codes to select a specific one of the suitable permutations.

As an alternative to permuting bits of the input signal, mixer 510 can be any logic that implements a one-to-one, "random" mapping of input signal values to output signal values. The output signal values can correspond to only a portion of the available memory storage and are not required to contain the same number of bits as are in the input signals. Techniques known for data encryption, which often uses keys, can also be employed for scrambling individual addresses or series of addresses. Circuits implementing one-to-one mappings are well known in the art. Mixers that implement simple permutations of bit values are only one example. Alternatively, a mapping circuit can include inverters on selected bits, parity check circuits that enable one permutation and set of inversions for even parity values and another permutation and set of inversions for odd parity values, or any random logic that provides a one-to-one mapping. Whether, a one-to-one mapping is sufficiently random depends on how well the mapping scatter sequential input values across and array or sector. In such embodiments, memory location 520 can either select a mapping circuit from among a group of circuits implementing "random" mappings and/or provide parameters for the mapping circuit.

Figure 6:
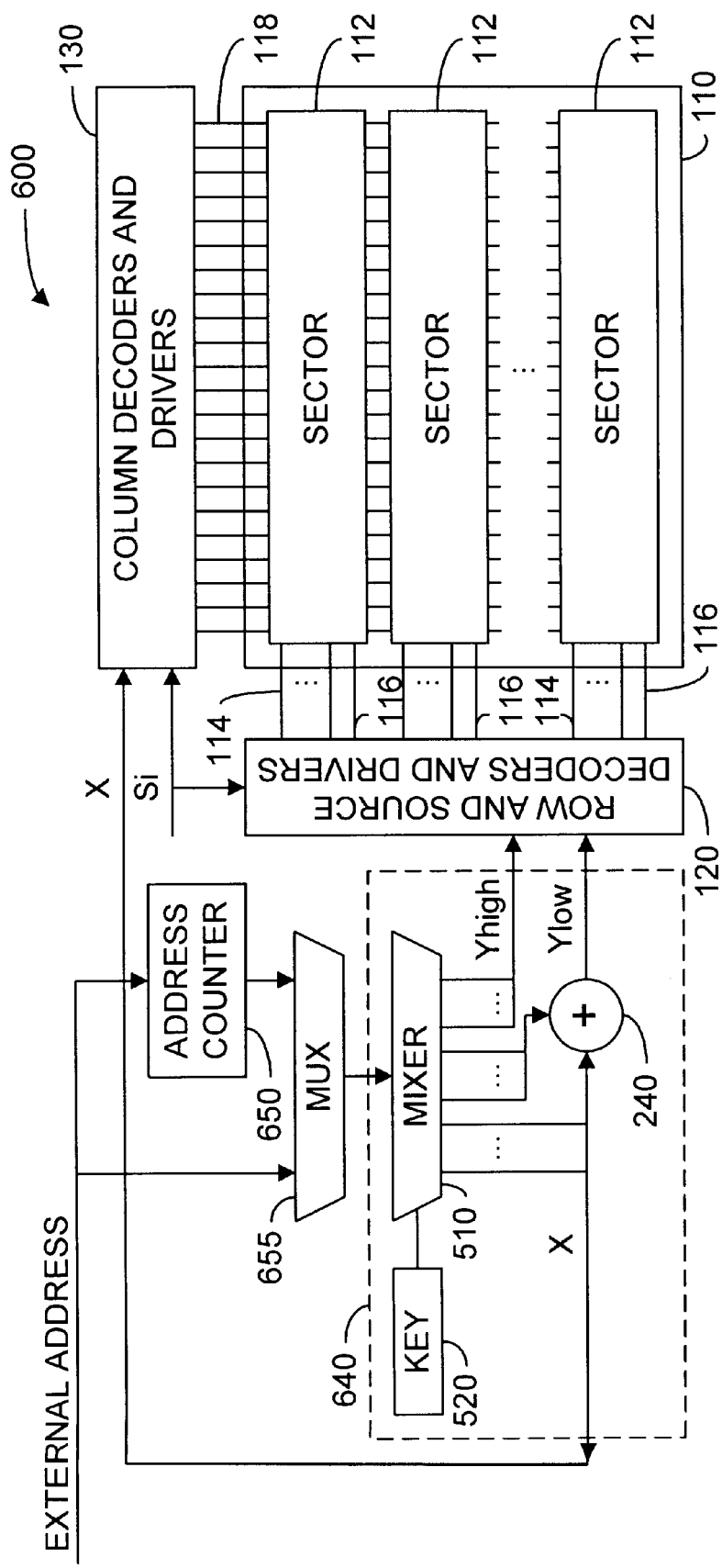
FIG. 6 shows a memory system in accordance with an embodiment of the invention including an address counter for recording and playing analog signals.

FIG. 6 shows a memory 600 permitting random access and writing and reading of data sequences, for example, for recording and playing of audio signals. Memory 600 includes row and source decoders and drivers 120, column decoders and drivers 130, and an array 110 having row-based sectors 112 as described above in regard to FIG. 1. For audio recording, an analog signal from a microphone or other device is sampled to generate sequential samples Si, and decoders and drivers 120 and 130 select and apply voltages to a memory cell in array 110 to set the threshold voltage of the memory cell at a level indicating one of samples Si. Memory 600 is placed in sequential mode where a multiplexer 655 provides an address signal from an address counter 650 to address scrambler 640. In this mode an external address initializes address counter 650 to a starting point of a sequential access, and counter 650 increments the logic address when each sample Si is written to memory array 110. Address scrambler 640 generates the physical addresses for selection of storage for samples Si. In particular, scrambler 640 converts the logical address from counter 650 to a physical address including physical column address X and physical row address Y. Sequential samples Si are written to memory array 110 at storage locations that the physical addresses identify.

Scrambler 640 includes mixer 510 that mixes all of the bits of the logical addresses using a one-to-one mapping selected according to a user-programmable key value from register 520. The key value is user-provided and selects one of a set suitable mappings. Output from mixer 510 includes a group of bits selected as the physical column address X, a group of bits Yhigh selected for the most significant bits of row address Y, and a group of bits that adder 240 adds to the physical column address X to generate the least significant bits Ylow of physical row address Y. Bits Yhigh select the sector to which the current sample is written. Accordingly, to keep consecutive samples having the same logical sector in the same physical sector, bits in Yhigh must only depend on the most significant bits of logical address (i.e., of the logical row address Y). The number of rows in a sector 112 determines the maximum number of bits in Ylow. Typically, although not necessarily, the maximum value of bits Ylow is equal to the number of rows in a sector. In an alternative embodiment, the key in register 520 selects the partition of row address Y between bits Ylow and bits Yhigh.

As noted above, suitable permutations or mappings of the logical address are selected according to the efficiency of scattering sequential address across the physical rows and columns. However, scrambler 640 includes adder 240 which further mixes sequential addresses. Accordingly, the net effect of adder 240 and mixer 510 must be considered. When security is a greater concern than reducing the effects of row or column defects, a set of suitable permutations or mappings includes permutations or mappings that provide incomprehensible playback when the key for playback differs from the key for recording.

For a playback operation, address counter 650 generates sequential logical addresses that scrambler 640 converts to physical addresses for reading memory array 110. Filters, a converter, and an amplifier (not shown) convert the samples read to an output analog audio signal which a speaker (not shown) coverts to sound. In order for the output audio signal to mimic the recorded signal, scrambler 640 must implement the same mapping during the playback operation as was used during the recording operation, that is, the user must provide the correct key.

For random access of memory array 110, memory 600 operates in a mode where multiplexer 655 provides the external address to scrambler 640. Scrambler 640 converts the external address to a physical address in array 110. Random access can be for any type of data and is not limited to sequential data or data representing an analog or continuous signal. The location of each datum in array depends on the key used when the datum was written and cannot be easily identified for reading without the appropriate key in register 520.

Figure 7:
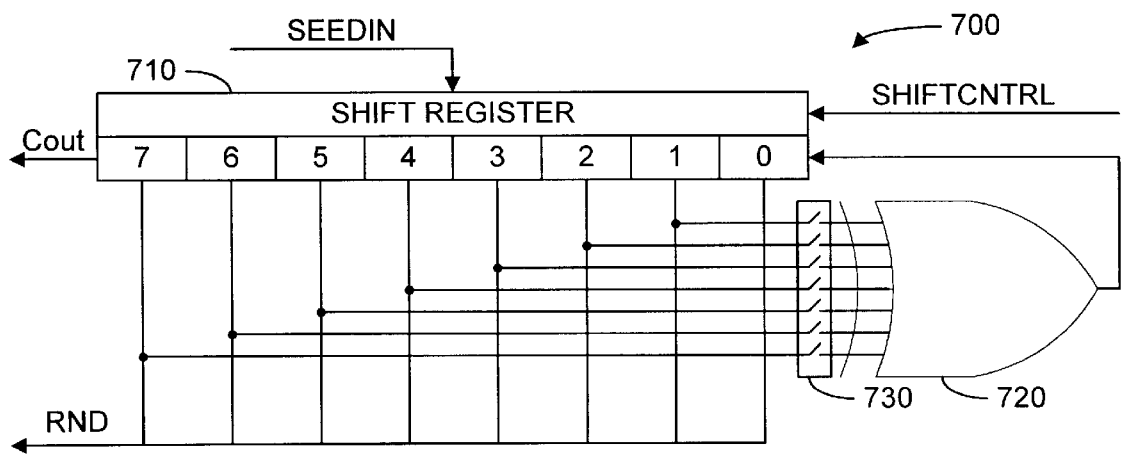
FIG. 7 shows a generator of a non-repeating random series multi-bit digital signal.

For scrambled random access to a memory, scrambler 640 maps logical addresses to physical address. However, when only sequential access is required, a scrambler can generate a random series without the need of an input address except to select a starting point of a sequential access. FIG. 7 illustrates a pseudo-random series generator 700 which includes a shift register 710, an XOR gate 720, and a programmable switch 730 and generates a pseudo-random series. Generator 700 has an 8-bit output signal RND that represents the content of shift register 710 and changes according to the pseudo-random series. Output signal RND and the content of shift register 710 are initialized accordingly to a non-zero input signal SEEDIN and change each time a control signal SHIFTCNTRL causes shift register 710 to perform a left shift. During a shift, a most significant bit shifts out of shift register 710 as an ignored carry bit Cout, and a bit from XOR gate 720 shifts into the least significant bit. XOR gate 720 generates an output bit that is 1 only when an odd number of the input bits are 1. Programmable switch 730 selects which bits from shift register 710 are input to XOR gate 720. Not all possible combinations of input bits generate a random series of suitable length. However, with bits 7, 3, 2, and 1 of shift register 710 connected to the input terminals of XOR gate 720, the content of shift register 710 takes on every value in a range from 1 to 255 before repeating any of the values. For a full 8-bit range of values (i.e., 0 to 255), a zero-valued signal (representing eight 0 bits) can be inserted at any point in the series in place of the output from shift register 710. While the zero-valued signal is asserted, the contents of shift register 710 is preserved so that the series can resume as normal when required.

Generator 700 is only one example of circuit that generates a pseudo-random series and can be varied in a variety of ways. For example, a right shift could be used. A larger or smaller shift register and an XOR gate coupled to the shift register can provide a different range for the pseudo-random series. W. H. Press, S. A. Teukolsky, W. T. Vetterling, and B. P. Flannery, "Numerical Recipes in C," 2nd edition, Cambridge University Press, 1992 describes pseudo-random number generators of this type using shifted values up to 100 bits in size.

Pseudo-random series generators like generator 700 are applicable in variety of ways to the circuits described herein. For example, for sequential memory access, the combination of adder 240, mixer 510, and address counter 650 as shown in FIG. 6 can be replaced with a pseudo-random series generator like generator 700 where the range of the random series is equal to the sector size. Storage location 520 provides seed signal SEEDIN to generator 700 at the start of the series for writing to or reading from a sector. Seed value SEEDIN may depend of the sector being accessed. The random series of addresses from the generator effectively eliminates long lapses and periodic errors caused by a row or column defect. In audio, for example, a row or column defect shows up as random noise rather than a periodic artifact or an interval of static. However, a seed value only selects a starting point for the random series, and an incorrect seed value may leave portions of a recording audible. Thus, security protection is minimal.

Figure 8:
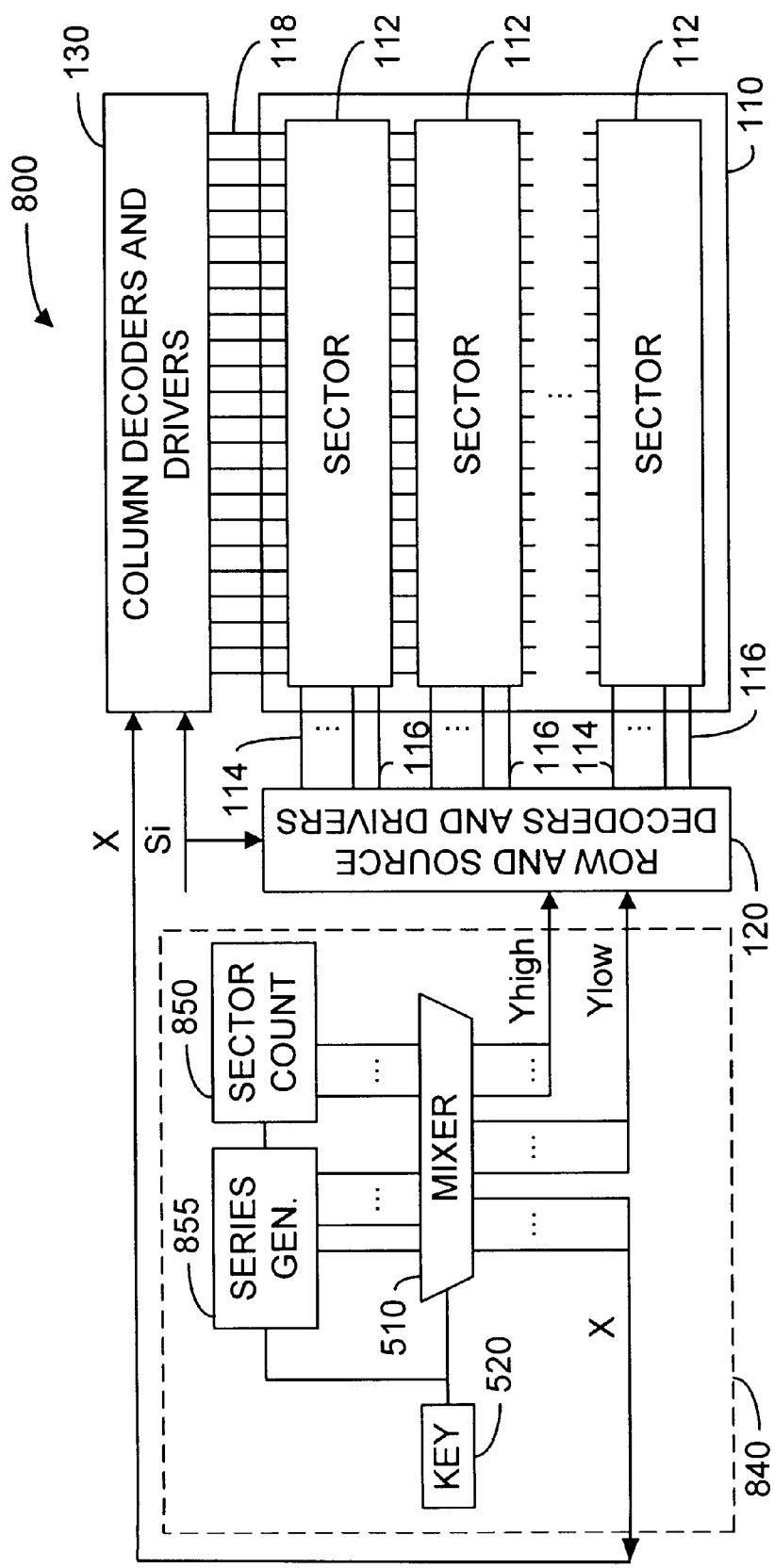
FIG. 8 shows a memory system in accordance with an embodiment of the invention including a generator such as in FIG. 7 to scramble addresses.

FIG. 8 shows a memory 800 having an alternative use of a random series generator 855 which is of the type shown in FIG. 7 but has a range matching the size of a sector 112 in memory array 110. Memory 800 is similar to memory 600 of FIG. 6 but has an address scrambler 840 that differs from address scrambler 640 of memory 600. In address scrambler 840, a sector counter 850 and series generator 855 provide the input address signal to mixer 510. For each memory location accessed, series generator 855 changes the output signal. Mixer 510 maps the bits of the signal from series generator 855 to a physical column address X and the low bits Ylow of row address Y. Sector counter 850 generates a sector count identifying the sector being accessed and increments or changes the sector count at the start of an access of a sector. To keep sequential samples Si together in a sector, mixer 510 has an output signal Yhigh that selects a sector 112 and is independent of the value from series generator 855. However, mapping of the series from generator 855 to signals X and Ylow can depend on the sector as identified by sector counter 850. Mixer 510 and key 520 provide additional user selectable scrambling for improved security over use of generator 855 without a mixer. A disadvantage of memory 800 is the difficulty of providing random access for data that was sequentially stored or is to be sequentially read. For example, finding a particular address may require several shifts in generator 855.

Although the invention has been described with reference to particular embodiments, the description is only an example of the invention's application and should not be taken as a limitation. In particular, even though much of preceding discussion was aimed at mappings implemented using permutations and additions, alternative embodiments of the invention can include any circuit that is capable of performing a mapping from a logical address space to a physical address space. Further, although use of a key value was discussed primarily in the context of selecting a permutation of bits of a logical address, such keys can be used generally as a parameter to select from among a family of mappings. Further, although embodiments of the invention were described in the context of data associated with sequential audio samples, embodiments of the invention are applicable to any organized or ordered data structure not limited to time ordered samples. For example, financial, medical, or other personal data can be stored in an access card containing a memory with address scrambling in accordance with the invention. In the event that the access card is lost or stolen, unauthorized retrieval of the stored information in meaningful form is difficult since logical addresses of data and therefore the meaning of the data stored depends on the access code. Further, data can be encrypted before storage using data encryption and stored using address scrambling or encryption as described herein. Various other adaptations and combinations of features of the embodiments disclosed are within the scope of the invention as defined by the following claims.

We claim:

1. A memory comprising:

an array of memory cells;

address decoders coupled to the array; and a scrambler coupled to the address decoders, wherein the scrambler converts a first address signal that is input to the scrambler to a second address signal that is provided to the address decoders to select a storage location in the array, the scrambler by converting the first address signal reduces effects of row and column defects in the memory.

2. The memory of claim 1, wherein:

the scrambler converts a first sequence of values of the first address signal to a second sequence of values of the second address signal:

the first sequence, if applied directly to the address decoders, would correspond to storage locations in a row in the array; and the second sequence, when applied to the address decoders, corresponds to storage locations in a plurality of rows of the array.

3. The memory of claim 1, wherein:

the scrambler converts a first sequence of values of the first address signal to a second sequence of values of the second address signal;

the first sequence, if applied directly to the address decoders, would correspond to a single column of storage locations in the array; and the second sequence, when applied to the address decoders, corresponds to storage locations in a plurality of columns of the array.

4. The memory of claim 1, further comprising a counter coupled to the scrambler, wherein the first address signal represents a count stored in the counter.

5. The memory of claim 4, further comprising a control circuit coupled to the counter and capable of controlling the memory for execution of a record operation, wherein during the record operation, a sequence of data values are written to the array and the counter increments the first address signal for each data value written.

6. The memory of claim 4, further comprising a control circuit coupled to the counter and capable of controlling the memory for execution of a playback operation, wherein during the playback operation, a sequence of data values are read from the array and the counter increments the first address signal for each data value read.

7. The memory of claim 1, wherein the scrambler is operable in a plurality of modes, each mode being associated with a different mapping of possible values of the first address signal to the possible values of the second address signal, and wherein the memory further comprises a mode selection circuit that selects the operating mode of the scrambler.

8. The memory of claim 7, wherein the mode selection circuit comprises storage for an access code that identifies the operating mode of the scrambler.

9. The memory of claim 1, wherein the first address signal and the second address signal are digital signals of equal width.

10. The memory of claim 1, wherein the array of memory cells, the address decoders, and the scrambler are components of a single monolithic integrated circuit.

11. The memory of claim 1, wherein:

the array includes a plurality of independently erasable sectors;

the scrambler converts a first sequence of values of the first address signal to a second sequence of values of the second address signal;

the first sequence, if applied directly to the address decoders, would identify storage locations in a single sector; and the second sequence, when applied to the address decoders, identifies storage locations in a single sector.

12. The memory of claim 11, wherein the first sequence of values identifies the same sector that the second sequence of values identifies.

13. The memory of claim 11, wherein the first sequence of values and the second sequence of values identify different sectors.

14. A method for operating a memory, comprising:

generating a first address signal that represents a first sequence of addresses, wherein each address in the first sequence comprises a row address and a column address, and the row addresses or the column addresses are constant throughout the first sequence;

converting the first address signal to a second address signal that represents a second sequence of addresses with neither row addresses nor column addresses being constant for the second sequence; and accessing a sequence of storage locations in the memory that corresponds to the second sequence of addresses and to a sound signal, wherein accessing data according to the second sequence of addresses instead of the first sequence of addresses reduces audible effects that row and column defects in the memory have on sound reproduced from the data in the sequence of storage locations.

15. The method of claim 14, wherein accessing the storage locations comprises writing values from a data sequence to the storage location identified by the second sequence of addresses.

16. The method of claim 14, wherein accessing the storage locations comprises reading values of a data sequence from the storage location identified by the second sequence of addresses.

17. The method of claim 14, further comprising:

identifying an access code for the operation of the memory; and selecting from a plurality of mappings a mapping that corresponds to the access code, wherein converting the first address signal comprises applying the selected mapping to the addresses in the first sequence to generate the addresses in the second sequence.

18. The method of claim 14, wherein the converting is performed by a circuit in an integrated circuit containing the memory.

19. A record-and-playback system comprising:

an array of memory cells;

address decoders coupled to the array; and a pseudo-random series generator coupled to the address decoders, wherein:

the pseudo-random series generator generates an address signal that is provided to the address decoders for a series of memory accesses identifying a data sequence corresponding to a sound;

for the series of memory accesses, values of the address signal form a pseudo-random series; and accessing the memory according to the pseudo-random series reduces audible effects that row and column defects in the memory have on the sound when reproduced from data in the memory.

20. The record-and-playback system of claim 19, further comprising volatile storage coupled to the pseudo-random series generator, wherein the volatile storage stores an access code, and the pseudo-random series generator selects the pseudo-random series according to the access code.

* * * * *